US012424790B2

(12) United States Patent
Chen et al.

(10) Patent No.: US 12,424,790 B2
(45) Date of Patent: Sep. 23, 2025

(54) POWER ADAPTER WITH REMOVABLE PLUGS

(71) Applicant: Hewlett-Packard Development Company, L.P., Spring, TX (US)

(72) Inventors: Feng Chen, Shanghai (CN); Jie Zhang, Shanghai (CN); Xu-Fei Shen, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 343 days.

(21) Appl. No.: 18/335,777

(22) Filed: Jun. 15, 2023

(65) Prior Publication Data

US 2024/0421538 A1 Dec. 19, 2024

(51) Int. Cl.

| | |
|---|---|
| ***H01R 13/629*** | (2006.01) |
| ***H01R 13/44*** | (2006.01) |
| ***H01R 27/00*** | (2006.01) |
| ***H01R 43/26*** | (2006.01) |
| ***H01R 105/00*** | (2006.01) |

(52) U.S. Cl.

CPC ....... *H01R 13/62905* (2013.01); *H01R 13/44* (2013.01); *H01R 27/00* (2013.01); *H01R 43/26* (2013.01); *H01R 2105/00* (2013.01)

(58) Field of Classification Search

CPC .. H01R 13/62905; H01R 13/44; H01R 27/00; H01R 43/26; H01R 2105/00

USPC .................................................. 439/131, 142

See application file for complete search history.

(56) References Cited

U.S. PATENT DOCUMENTS

| | | | | |
|---|---|---|---|---|
| 5,401,178 A * | 3/1995 | Liu | H01R 35/04 439/131 |
| 7,008,246 B2 * | 3/2006 | Zhuge | H01R 31/06 439/131 |
| 7,125,266 B1 * | 10/2006 | Huang | H01R 35/04 439/131 |
| 7,573,159 B1 | 8/2009 | Deiuliis et al. | |
| 7,658,625 B2 | 2/2010 | Jubelirer et al. | |
| 8,638,064 B2 * | 1/2014 | Sulem | H02J 7/0042 439/131 |
| 8,777,644 B2 * | 7/2014 | Pai | H01R 13/71 439/131 |

(Continued)

FOREIGN PATENT DOCUMENTS

| | | |
|---|---|---|
| CN | 201887494 U | 6/2011 |
| CN | 202977923 U | 6/2013 |
| CN | 114512852 A | 5/2022 |

*Primary Examiner* — Gary F Paumen

(74) *Attorney, Agent, or Firm* — Quarles & Brady LLP

(57) ABSTRACT

The present disclosure provides a power adapter including a body and a plug removably connected to the body. In one example, the plug has a second base defining a groove, a housing, and a prong rotatably mounted to the housing. In another example, the body has a tongue extending from a first base, which slides within the groove of the plug to prevent movement of the plug in a first direction. In one example, rotation of the prong actuates a pin held within the plug. For example, the pin recedes into the second base when the prong is in a first position and protrudes from the second base when the prong is in a second position. In one example, the pin prevents movement of the plug in a second direction, different from the first direction, when the prong is in the second position.

15 Claims, 12 Drawing Sheets

(56) References Cited

U.S. PATENT DOCUMENTS

| | | | | |
|---|---|---|---|---|
| 8,790,124 | B2 * | 7/2014 | Lee | H01R 31/06 439/131 |
| 8,888,513 | B2 * | 11/2014 | Shi | H01R 13/44 439/131 |
| 2013/0288493 | A1 * | 10/2013 | Shi | H01R 31/06 439/131 |
| 2013/0316553 | A1 * | 11/2013 | Lee | H01R 35/04 439/131 |
| 2014/0199865 | A1 * | 7/2014 | De | H01R 31/065 439/131 |
| 2015/0229061 | A1 * | 8/2015 | Hsu | H01R 24/68 439/131 |

* cited by examiner

POWER ADAPTER WITH REMOVABLE PLUGS

BACKGROUND

Power adapters, such as power adapters for electronic devices, enable a user to charge and/or power an electronic device via a power outlet (e.g., a wall outlet). For example, a user may plug the power adapter into the power outlet to transfer power from the outlet into the electronic device. In some examples, the power adapter may include a removable plug, which enables a user to change and/or modify the plug type. For example, a user may change and/or modify the plug type when traveling to accommodate different outlet configurations.

BRIEF DESCRIPTION OF THE DRAWINGS

The following drawings are provided to help illustrate various features of examples of the disclosure and are not intended to limit the scope of the disclosure or exclude alternative implementations.

DETAILED DESCRIPTION OF THE PRESENT DISCLOSURE

Figure 1:
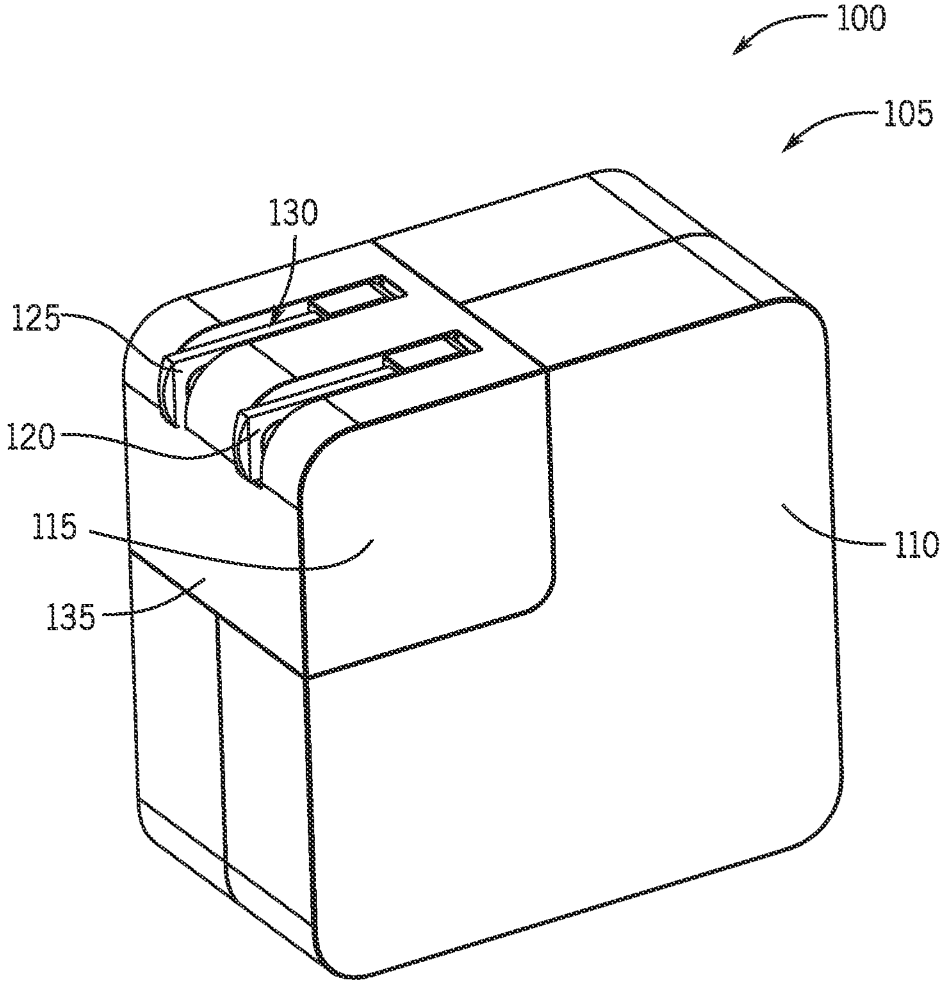
FIG. 1 is a perspective view of an example of a power adapter according to aspects of the present disclosure.

The disclosed technology is not limited in its application to the details of construction and the arrangement of components set forth in the following description or illustrated in the following drawings. Other examples of the disclosed technology are possible, and examples described and/or illustrated here are capable of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following detailed description is to be read with reference to the figures, in which like elements in different figures have like reference numerals. The figures, which are not necessarily to scale, depict selected examples and are not intended to limit the scope of examples of the disclosure.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

In some examples, the technology disclosed herein provides a power adapter including a body and a plug removably connected to the body. In one example, the plug has a second base defining a groove, a housing, and a prong rotatably mounted to the housing. In another example, the body has a tongue extending from a first base, which slides within the groove of the plug to prevent movement of the plug in a first direction. In one example, rotation of the prong actuates a pin held within the plug. For example, the pin recedes into the second base when the prong is in a first position and protrudes from the second base when the prong is in a second position. In one example, the pin prevents movement of the plug in a second direction, different from the first direction, when the prong is in the second position.

In some examples, the technology disclosed herein provides a power adapter including a body defining a notch. In one example, the notch has a first base defining an aperture. The power adapter may include a plug removable from the body, which includes a locking assembly. The locking assembly may include a rotatable shaft with a cam fixed to an end of the shaft. The shaft may further include a prong fixed to the shaft. In some examples, rotation of the prong generates corresponding rotation in the shaft. The locking assembly may further include a pin with a first end and a second end. The first end of the pin may be in contact with the cam and the second end of the pin may selectively engage the aperture in the notch to prevent movement of the plug in a second direction. In one example, the prong can be rotated between a first position and a second position. In the first position, the pin recedes into the locking assembly, and in the second position the pin protrudes into the aperture.

In some examples, the technology disclosed herein provides a method. The method can include securing a removable plug to a body of a power adapter. The method can include rotating a prong of the plug into a first position. In one example, rotation of the prong generates corresponding rotation in a shaft fixed to the prong to actuate a pin within the plug. The method can include aligning a tongue extending from a first base of the body with a groove defined by a second base of the plug. The method can include sliding the second base of the plug along the first base of the body until a second face of the plug abuts a first face of the body. The method can include rotating the prong of the plug into a second position. In one example, rotation of the prong into the second position actuates the pin to protrude through the second base of the plug and into an aperture within the first base of the body.

FIG. 1 illustrates an example of a power adapter 100 in a first position 105. The power adapter 100 includes a body

110 and a removable plug 115. The plug 115 may be used to plug the power adapter 100 into an outlet (e.g., wall outlet and/or other outlet) to charge an electronic device. Example electronic devices may include computers such as laptop, desktop, or all-in-one computers, tablets, mobile devices, laptops, radios, imaging devices such as printers or scanners, additive manufacturing machines such as 3D printers, and/or any other device, which receives and/or is powered/charged by electricity. In one example, the power adapter 100 receives alternating current (AC) from the outlet and outputs direct current (DC) to the electronic device for charging and/or powering the device (e.g., via a rectifier within the power adapter). In other examples, the power adapter 100 receives DC from the outlet and outputs AC to the electronic device for charging and/or powering the device (e.g., via an inverter within the power adapter). In yet other examples, the power adapter 100 receives AC from the outlet and outputs AC to the electronic device for charging and/or powering the device. In another example, the power adapter 100 receives DC from the outlet and outputs DC to the electronic device for charging and/or powering the device.

In the first position 105, a prong of the plug 115 is in a first (stowed) position, which unlocks relative movement between the body 110 and the plug 115. For example, in the first (stowed) position, a first prong 120 and a second prong 125 are arranged within a slot 130 defined by a cover 135 of the plug 115 such that the first prong 120 and the second prong 125 do not protrude from the plug 115. In one example, the plug 115 may be removed from the body 110 by a user when the power adapter 100 is in the first position 105. To facilitate modularity of the power adapter 100, the plug 115 may be modified, replaced, and/or exchanged by any number of different plug types. For example, the plug 115 may be a Type A, Type B, Type C, Type D, Type E, Type F, Type G, Type H, Type I, Type J, Type K, Type L, Type M, Type N, or Type O plug, and/or any combination thereof. In the illustrated example, the plug 115 is a Type A plug. To further facilitate modularity of the plug, the plug may include a different number of prongs, such as one, two, three, four, five, and/or any number of prongs of any shape and/or size corresponding to an outlet.

The body 110 of the power adapter 100 may be a variety of shapes and/or sizes based on an intended use of the power adapter 100. For example, the body 110 may be rectangular, cubical, spherical, polygonal, and/or any other shape. In some examples, the power adapter 100 may be used with a variety of outlet voltages from 110 VAC-480 VAC based on the plug 115 used with the power adapter 100.

Figure 2:
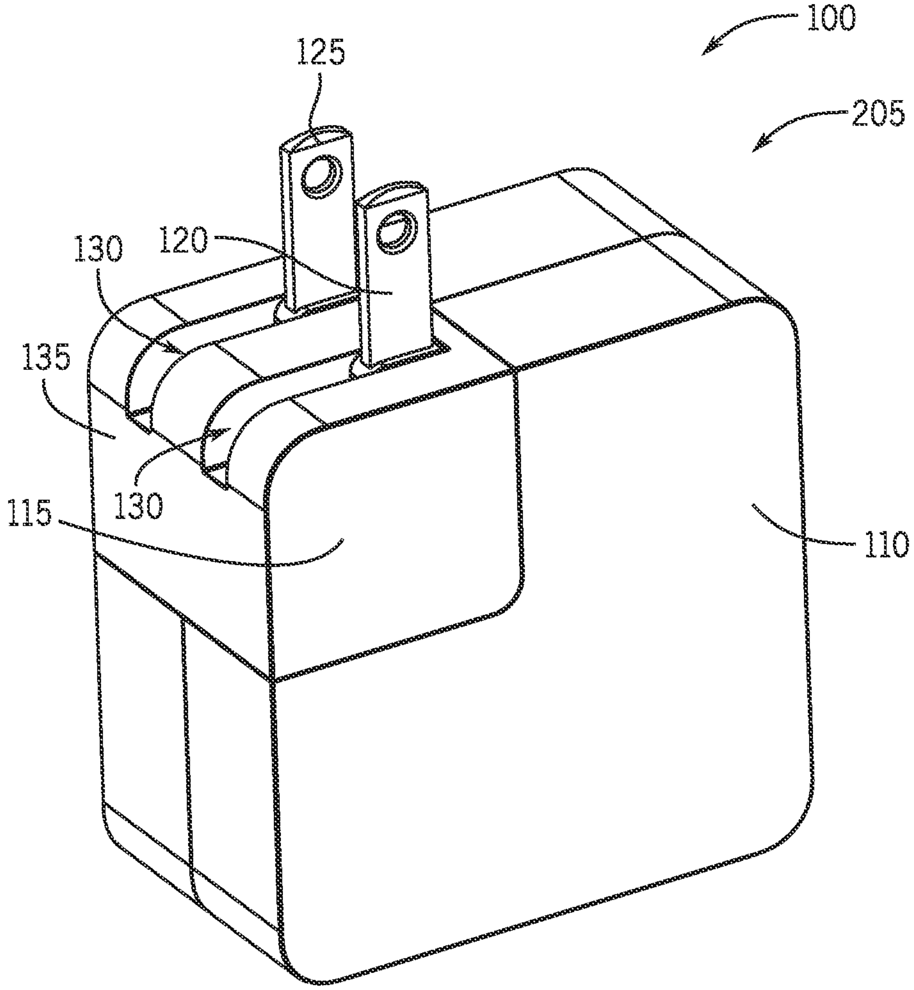
FIG. 2 is a perspective view of the example power adapter of FIG. 1 in a second position.

FIG. 2 illustrates an example of the power adapter 100 in a second position 205. In the second position 205 the first prong 120 and the second prong 125 are rotated away from the plug 115, so that the first prong 120 and the second prong 125 protrude away (outward) from the plug 115. In one example, the first prong 120 and the second prong 125 are rotated 45-135 degrees away from the plug 115. In another example, the first prong 120 and the second prong 125 are rotated approximately 90 degrees. In the second position 205, the first prong 120 and the second prong 125 may be perpendicular and/or substantially perpendicular to the plug 115. In the second position 205, the first prong 120 and the second prong 125 are in a second (deployed) position, which locks relative movement between the body 110 and the plug 115. For example, the plug 115 locks to the body 110 to prevent accidental disconnection of the plug 115 from the body 110 when plugging and/or unplugging the power adapter 100 from an outlet.

Figure 3:
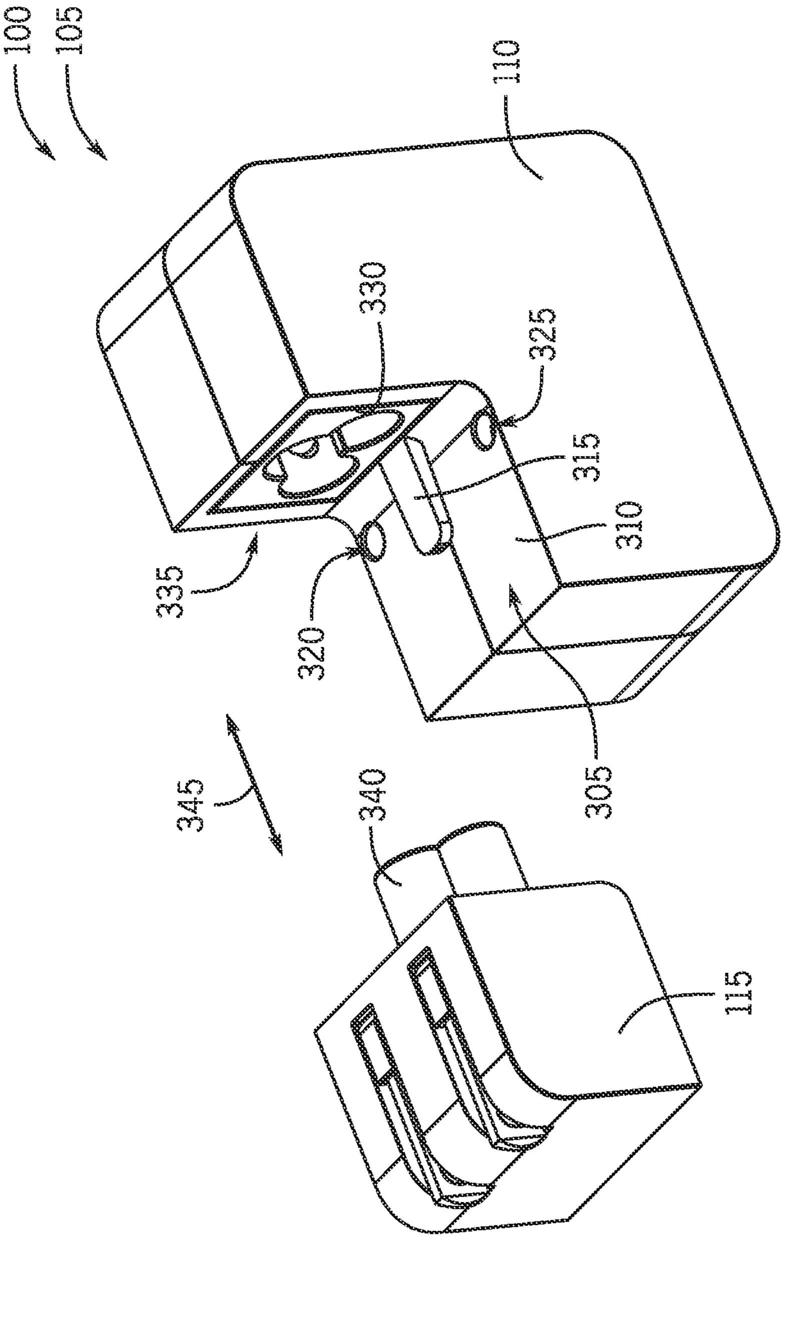
FIG. 3 is a perspective view of the example power adapter of FIG. 1.
Figure 4:
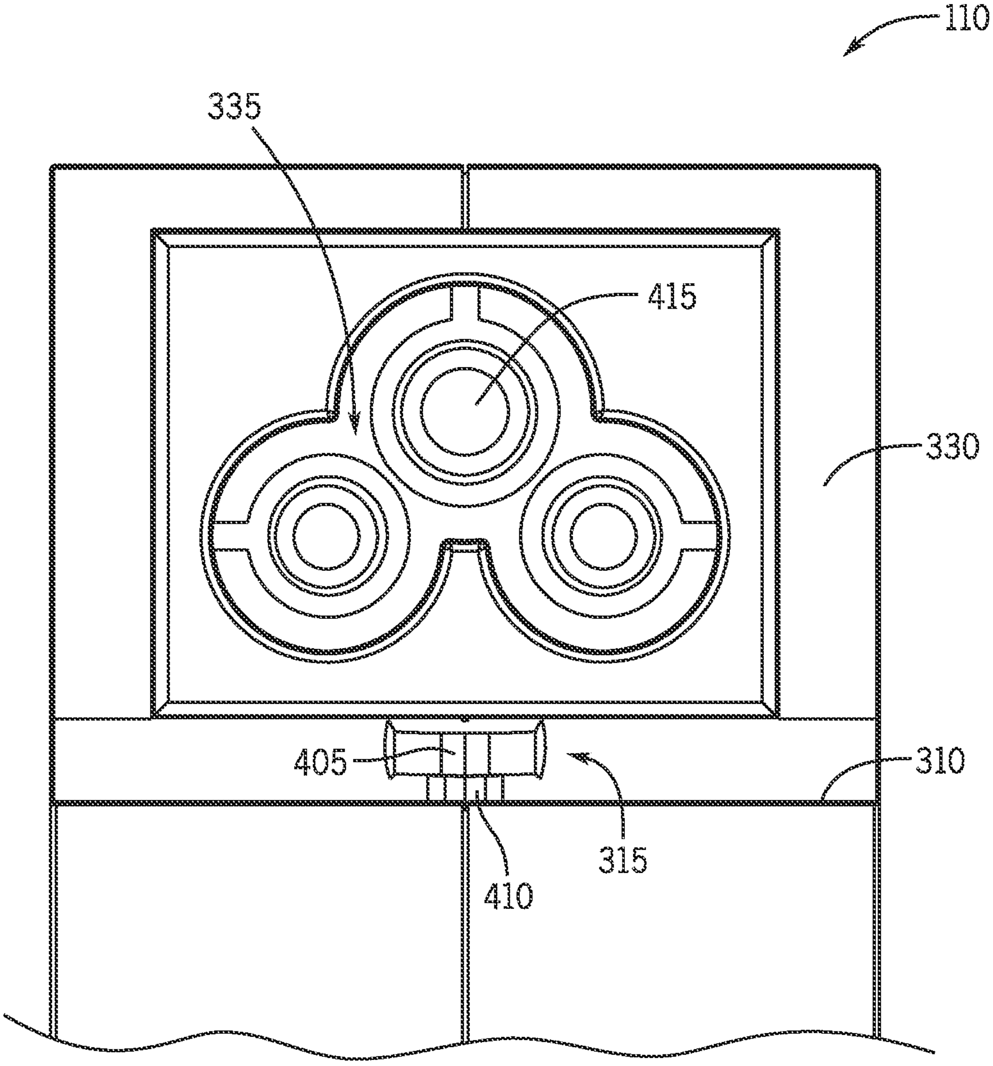
FIG. 4 is a front view of a portion of a body of the example power adapter of FIG. 1.
Figure 5:
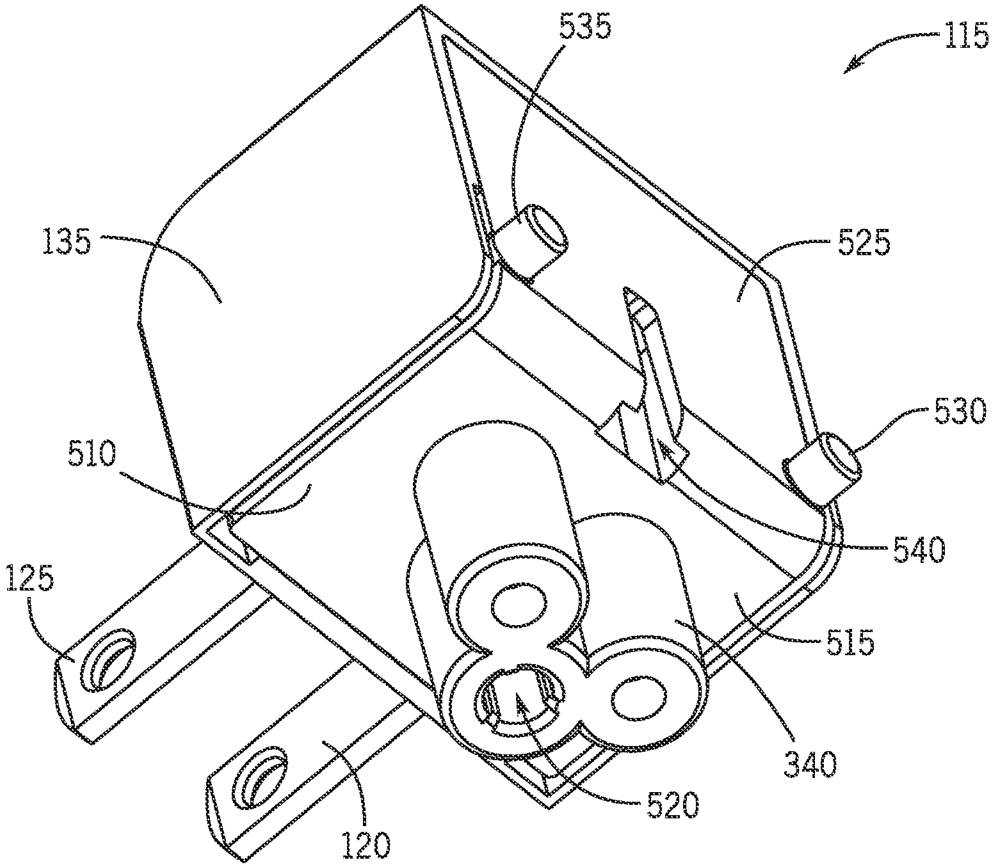
FIG. 5 is a perspective view of one example of a removable plug of the power adapter of FIG. 1.

With reference to FIGS. 3-5, the body 110 includes a notch 305, which receives the plug 115. In one example, the notch 305 matches the shape and/or arrangement of the plug 115 to present a uniform and/or unbroken perimeter around the power adapter 100. However, in other examples, the notch 305 may define other shapes, which may be different from a shape of the plug 115. The notch 305 includes a first base 310 with a tongue 315 and an aperture. In one example, the notch 305 defines a first aperture 320 and a second aperture 325 corresponding to a first pin 530 and a second pin 535 of the plug 115. The tongue 315 slides within and/or mate with a groove 540 of the plug 115. In one example, the groove 540 of the plug 115 is formed within a second base 525 of a housing 510 of the plug 115. The second base 525 contacts (e.g., slides across) the first base 310 of the notch 305 to mate the tongue 315 within the groove 540. In one example, the tongue 315 forms an elongate "T" shape with a head 405 and a neck 410. The head 405 slides within the groove 540 and contacts an interior surface of the second base 525 to prevent removal of the plug 115 from the body 110 in a first direction.

The notch 305 further includes a first face 330 defining a female receptacle 335. The female receptacle 335 mates with a corresponding male connection 340 extending outward from a second face 515 of the housing 510. The female receptacle 335 receives the male connection 340 to enable the flow of electricity from the outlet, through the prongs, and from the male connection 340/female receptacle 335 into the body 110, which provides electrical power to the electronic device via a cord, wire, magnetic, and/or wireless connection. To facilitate the transfer of electricity from the plug 115 to the body 110, the male connection 340 includes a pin receptacle 520, which receives an electrical pin 415 of the body 110. In one example, the male connection 340 may include three (3) pin receptacles 520, which receive three (3) electrical pins 415 of the body 110. In other examples, more and/or fewer pin receptacles 520 and/or corresponding electrical pins 415 may be used.

As indicated by arrow 345, the plug 115 may be removed from and/or inserted into the notch 305. For example, a user may remove the plug 115 from the notch 305 by rotating the prongs 120, 125 into the first position 105 and sliding the plug 115 away from the body 110 as shown by arrow 345. Correspondingly, a user may insert the plug 115 into the notch 305 by aligning the groove 540 with the tongue 315 and sliding the second base 525 of the plug 115 along the first base 310 of the notch 305 until the second face 515 of the plug 115 contacts the first face 330 of the notch 305. At this time, the plug 115 is in electrical connection with the body 110 via the female receptacle 335 and the male connection 340. To secure the plug 115 to the body 110, the prongs 120, 125 can be rotated into the second position 205 to arrange the first pin 530 and the second pin 535 within the corresponding first aperture 320 and second aperture 325.

Figure 6:
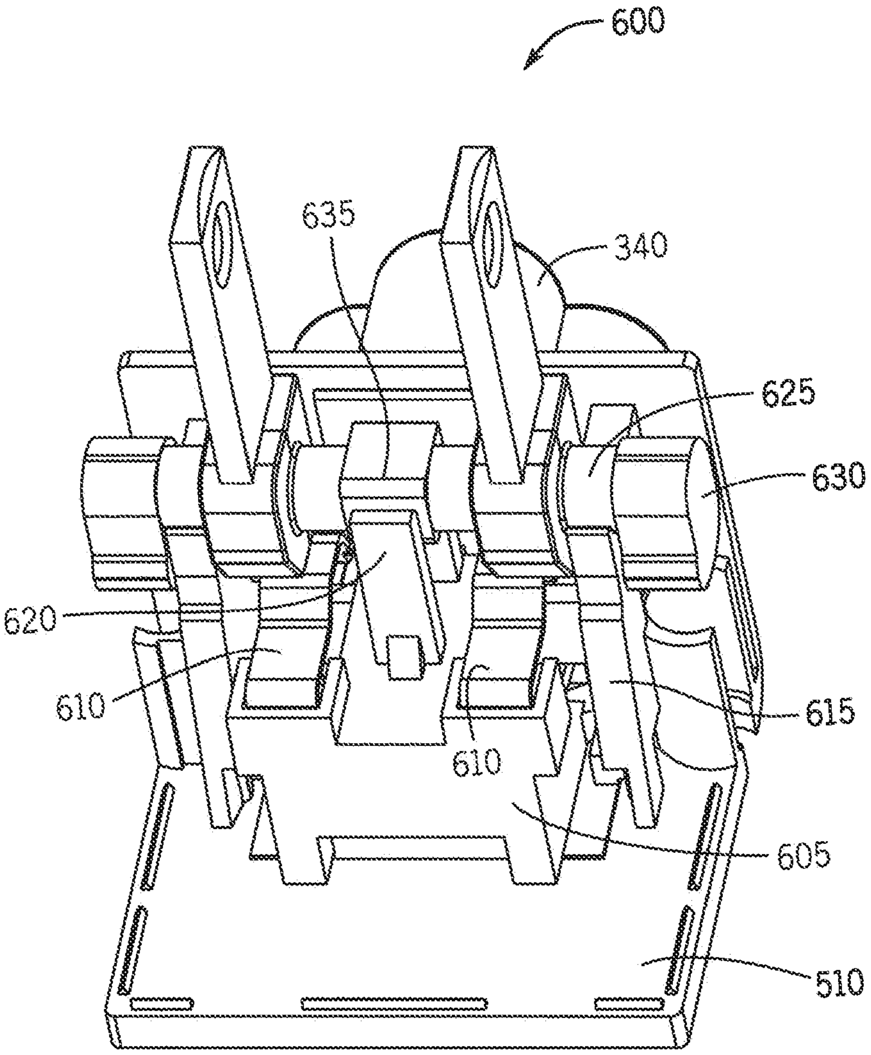
FIG. 6 is a perspective view of a locking assembly of the example removable plug of FIG. 5.
Figure 7:
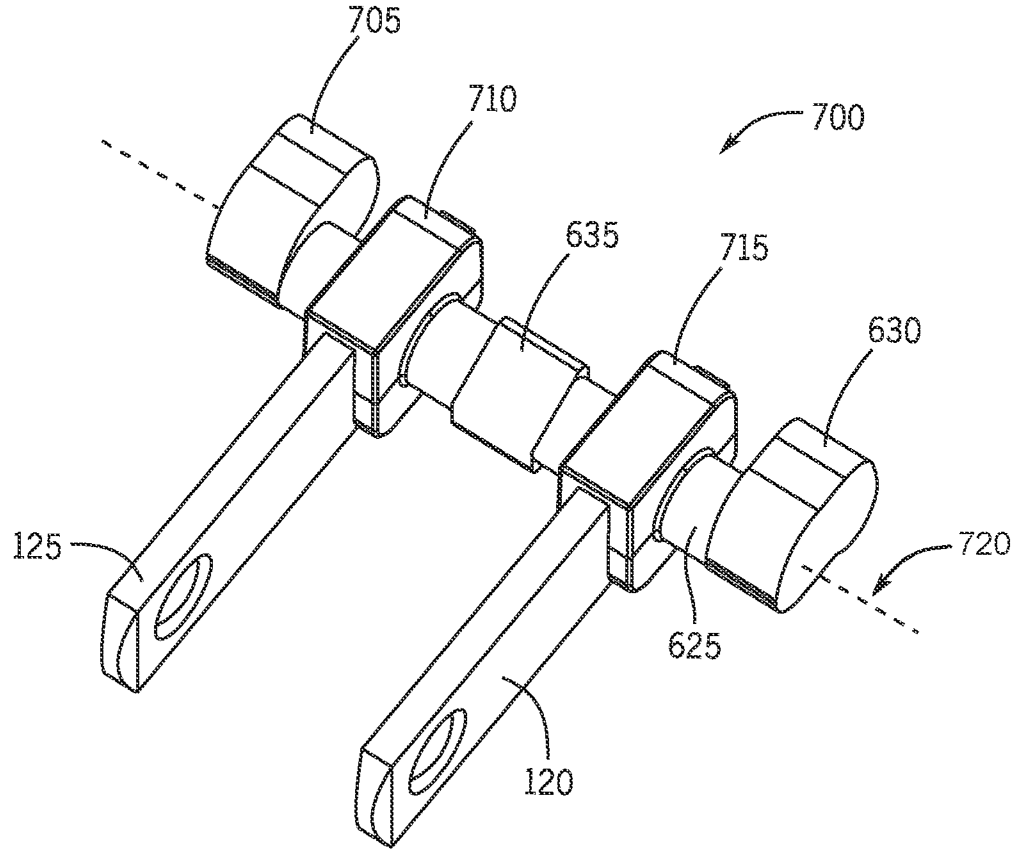
FIG. 7 is a perspective view of a rotatable shaft of the locking assembly of FIG. 6.

FIGS. 6 and 7 show an example of a locking assembly 600 and a prong assembly 700 of the plug 115. The locking assembly 600 includes a pedestal 605 extending away from the second face 515 of the housing 510. The pedestal 605 supports the prong assembly 700 within the plug 115. The prong assembly 700 includes a shaft 625, which secures the prongs 120, 125 to the shaft 625 via a second prong support 710 and a first prong support 715. In one example, the prongs 120, 125 are secured to the shaft 625 so that rotation of the prongs 120, 125 generates corresponding rotation in the shaft 625 (e.g., 90 degree rotation of the prongs generates 90 degree rotation of the shaft) about an axis 720. In one example, axis 720 extends through a center and/or midpoint of the shaft 625 and defines an axis of rotation for the shaft 625. At both first and second ends of the shaft 625 is a cam. For example, the shaft 625 may include a first cam 630 and a second cam 705, each corresponding to a pin (e.g., first pin 530 and second pin 535, respectively). In one example, the first and second cams 630, 705 each include a lobe (e.g., lobe 905 shown in FIG. 9), which is radially offset from axis 720. In other examples, the shaft 625 may include more and/or fewer cams, such as one, three, four, five, and/or any other number of cams.

In one example, a pair of towers 615 support the shaft 625 within the plug 115. To prevent accidental rotation of the prongs, the pedestal 605 includes a retention support 620, which mates with and/or grips a retention block 635 of the shaft 625. In one example, the retention block 635 defines a rectangular and/or polygonal shape to prevent accidental (e.g., forceless and/or low force) rotation of the prongs 120, 125. In one example, the retention support 620 and the retention block 635 form a positive lock and/or snap-fit connection so that rotation of the prongs 120, 125 by approximately 90 degrees locks the prongs into position. Thus, the prongs 120, 125 can be locked into either the first position 105 and/or the second position 205 until a user applies a force to the prongs 120, 125 to rotate and/or move the prongs into a different position.

To facilitate the transfer of electricity from the outlet, through the plug 115, and into the electronic device, the pedestal 605 receives an electrical contact 610, which may contact a second prong support 710 and/or a first prong support 715 of the prong assembly 700. In one example, the pedestal 605 receives a pair of electrical contacts 610. In other examples, the pedestal 605 receives a single electrical contact and/or more than a pair of electrical contacts, such as three, four, five, and/or more electrical contacts. In one example, the contacts 610 are made from a metal and/or metallic material sufficient to transfer electricity from the prongs 120, 125 to the electronic device. In another example, the second prong support 710 and first prong support 715 selectively contact the electrical contacts 610 when the power adapter 100 is in the second position 205. In other examples, the second prong support 710 and the first prong support 715 contact the electrical contacts 610 when the power adapter 100 is in both the first position 105 and the second position 205. The first and second prong supports 715, 710 may be made from a metal and/or metallic material sufficient to transfer electricity from the prongs 120, 125 to the corresponding electrical contacts 610.

Figure 8:
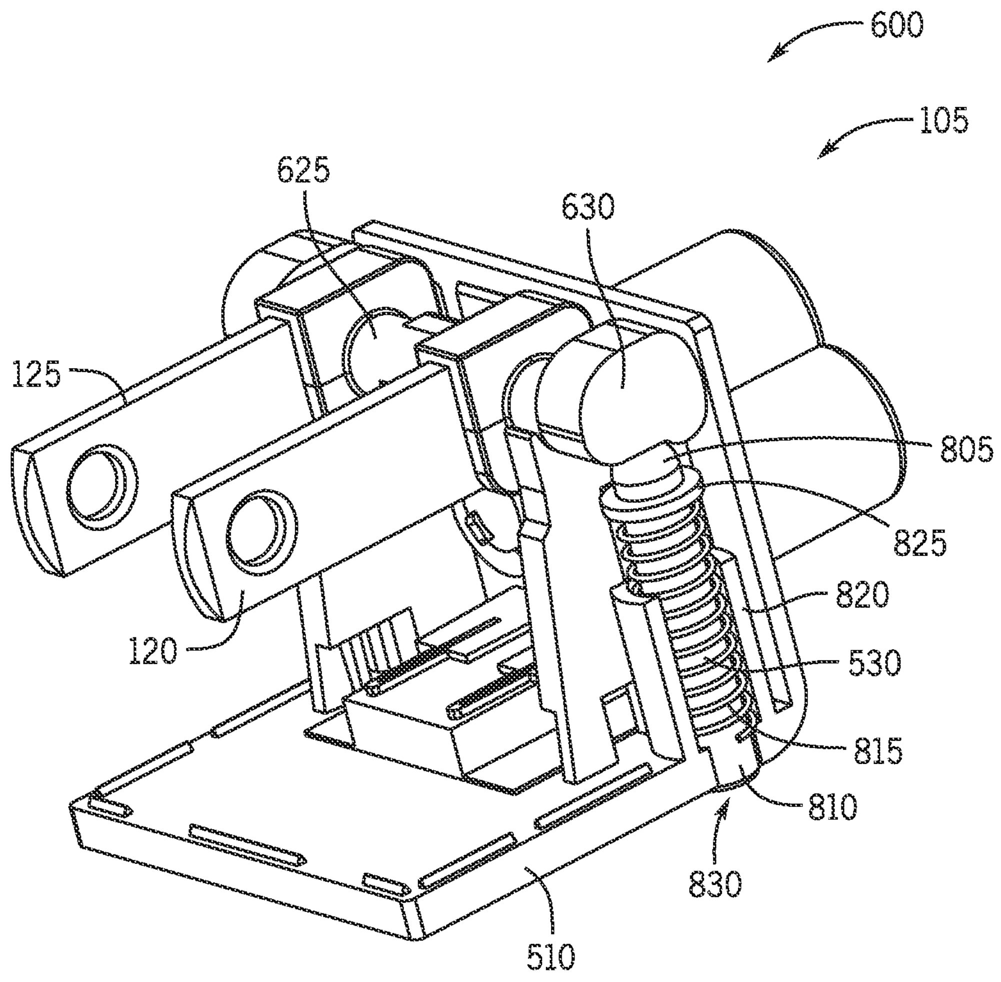
FIG. 8 is a perspective view of the locking assembly of FIG. 6 in a first position.
Figure 9:
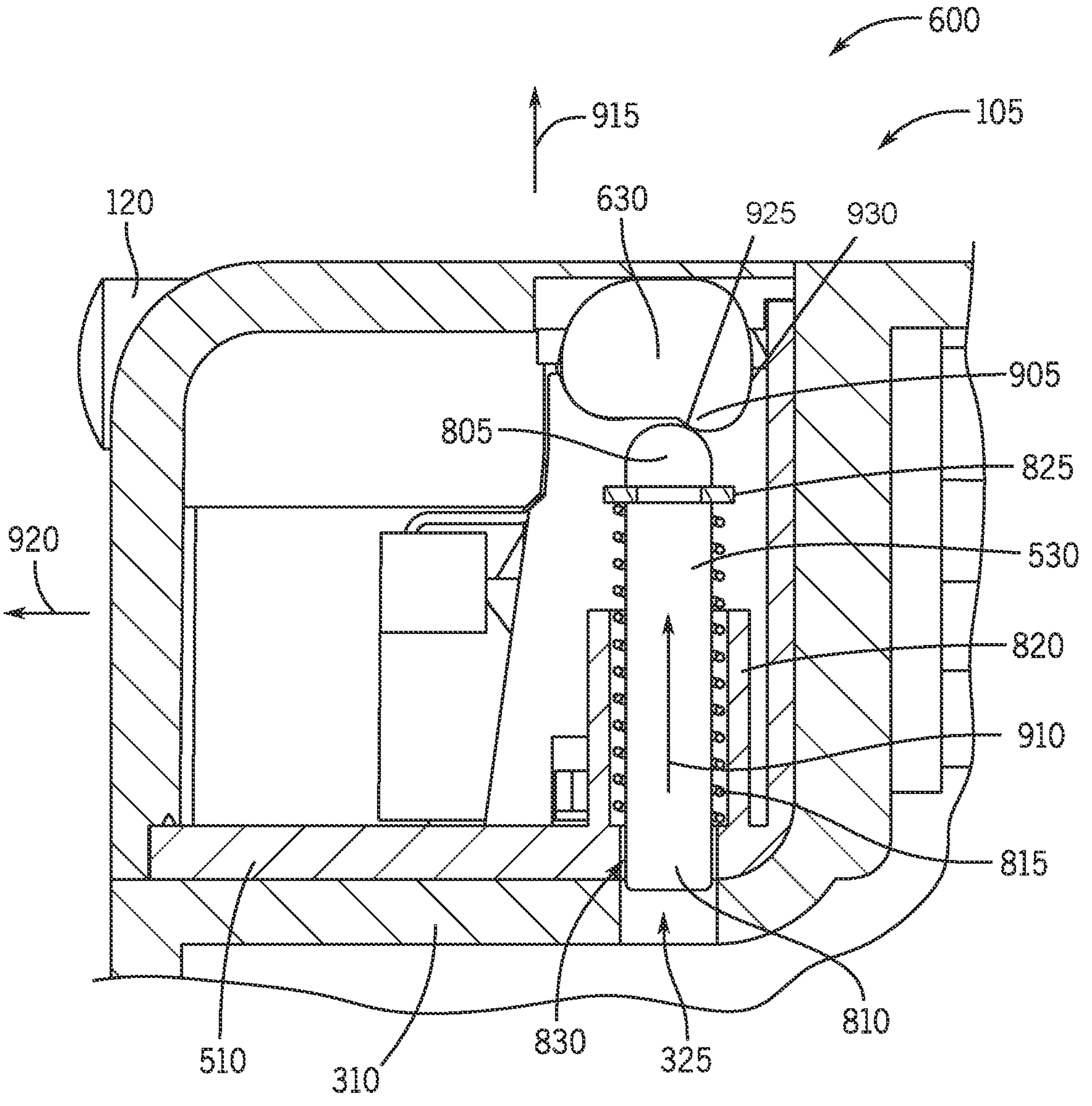
FIG. 9 is a side view of a portion of the example power adapter of FIG. 1 in the first position.

FIGS. 8 and 9 show examples of the locking assembly 600 in the first position 105. In the first position 105, the shaft 625 is oriented such that the cams 630, 705 position a first end 805 of the pins 530, 535 relatively nearer to axis 720 than in the second position 205 (shown in FIG. 11). For example, the first end 805 of the pins 530, 535 contact a first side 925 of the cams 630, 705 when in the first position 105, which is positioned relatively nearer to axis 720 than a second side 930 of the cams 630, 705. Thus, a second end 810 of the pins 530, 535 does not protrude from an opening 830 in the housing 510 of the plug 115. Instead, the second end 810 of the pins is recessed within the opening 830. In another example, the second end 810 of the pins is flush with the opening 830.

A biasing element 815 circumferentially surrounds the pins 530, 535 to bias the pins away from an exterior of the housing 510 (biasing direction shown by arrow 910) and automatically retract the pins within the opening 830 when the power adapter 100 is in the first position 105. In one example, the biasing element 815 is a spring. In other examples, the biasing element 815 may be rubber and/or another flexible material. The biasing element 815 is positioned between the housing 510 and a collar 825 located at the first end 805 of the pins 530, 535. The pins 530, 535 and the biasing element 815 are held within a pin guide 820 extending vertically upward from the housing 510. The pin guide 820 contains the pins 530, 535 and biasing element 815 to prevent accidental misalignment and/or lateral deflection of the pins and/or biasing element 815. As mentioned previously, in the first position 105, the plug 115 is prevented from movement in the direction indicated by arrow 915. For example, the plug 115 is prevented from movement in the direction indicated by arrow 915 via the connection between the tongue 315 and the groove 540. However, the plug 115 is able to move in a direction indicated by arrow 920. For example, a user may move the plug 115 in the direction indicated by arrow 920 to remove the plug 115 from the power adapter 100 and/or add the plug 115 to the power adapter 100.

Figure 10:
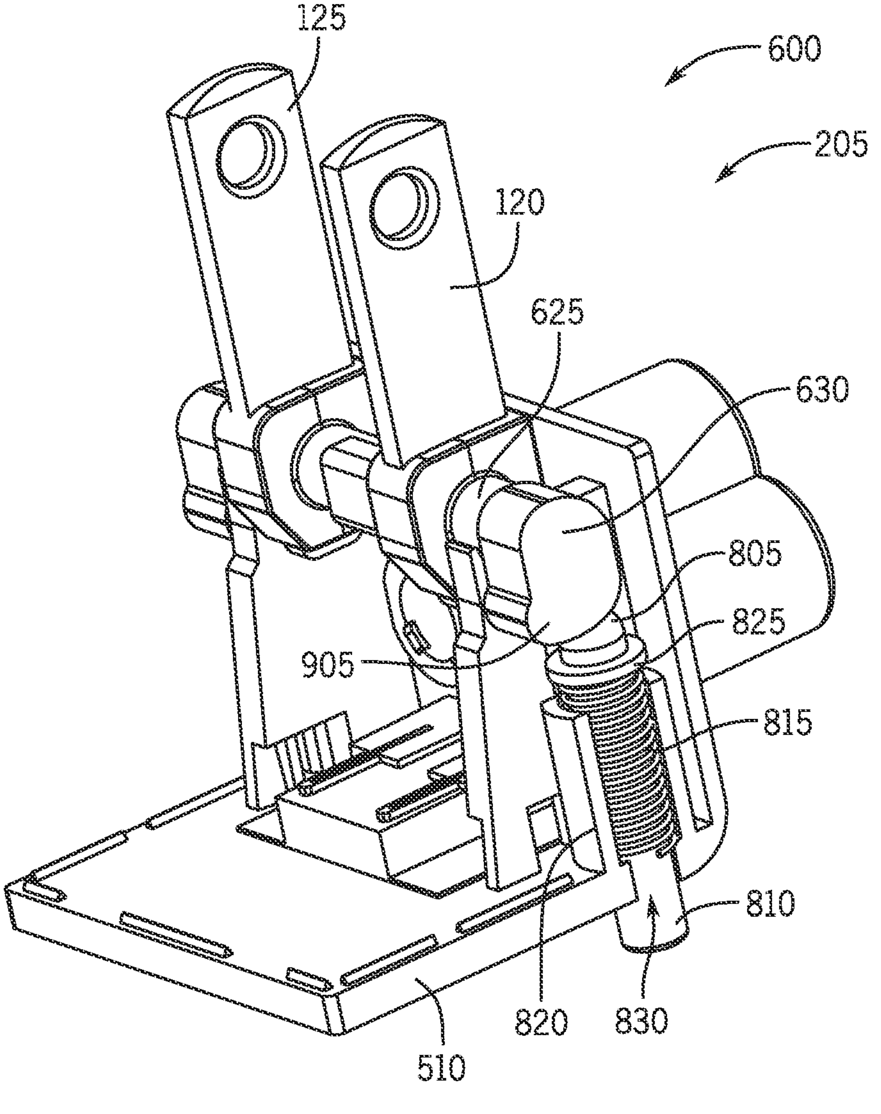
FIG. 10 is a perspective view of the locking assembly of FIG. 6 in the second position.
Figure 11:
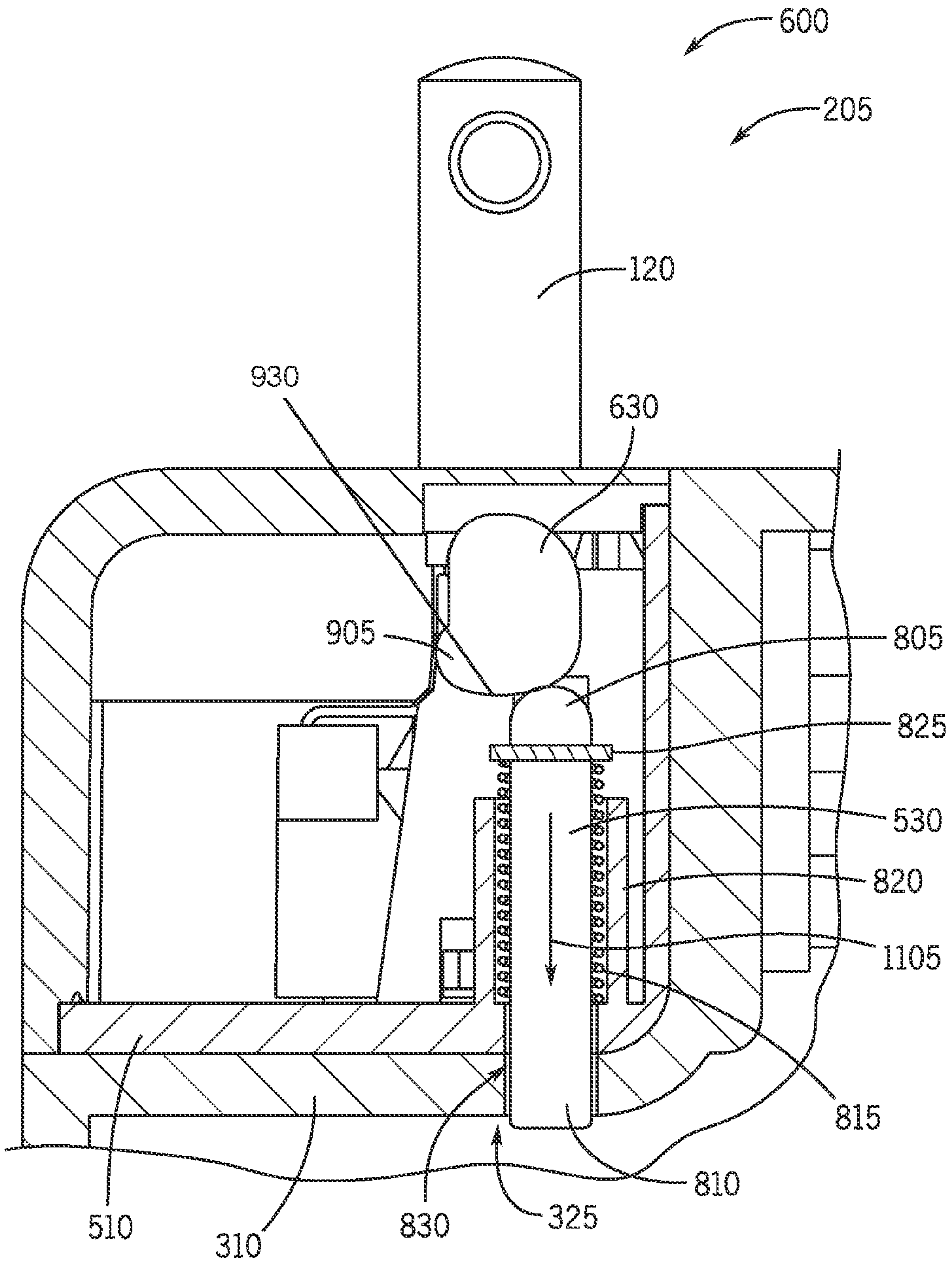
FIG. 11 is a side view of a portion of the example power adapter of FIG. 1 in the second position.

FIGS. 10 and 11 show examples of the locking assembly 600 in the second position 205. In the second position 205, the shaft 625 is oriented such that the cams 630, 705 position the first end 805 of the pins 530, 535 relatively farther from axis 720 than in the first position 105 (shown in FIG. 9). For example, the first end 805 of the pins 530, 535 contacts the second side 930 of the cams 630, 705 when in the second position 205, which is positioned relatively farther from axis 720 than the first side 925 of the cams 630, 705. In one example, during rotation of the shaft 625, the lobe 905 of the cams 630, 705 forces the pins 530, 535 downwards in the direction shown by arrow 1105 against the biasing force of the biasing element 815. In one example, the shaft 625 is rotated (e.g., via rotation of the prongs) until the first end 805 of the pins contacts the second side 930 of the cams 630, 705. With the first end 805 of the pins contacting the second side 930 of the cams 630, 705, the second end 810 of the pins 530, 535 protrudes through the corresponding openings 830 of the housing 510 and into the corresponding apertures 320, 325 in the first base 310.

Once the pins 530, 535 have engaged the apertures 320, 325 in the first base 310, the plug 115 is locked and/or prevented from movement in two different directions as indicated by arrow 915 and arrow 920. For example, the plug 115 is prevented from movement in the direction indicated by arrow 915 via the connection between the tongue 315 and the groove 540. Additionally, the plug 115 is prevented from movement in a second, different, direction indicated by arrow 920 via the interference between the pins 530, 535 and the apertures 320, 325.

In another example, the plug 115 is prevented from movement in a third direction (different from both the first and second directions) via the connection between the electrical pins 415 and the pin receptacles 520, and the interference between the pins 530, 535 and the apertures 320, 325. In one example, the third direction is the Z direction (e.g., facing in/out of the paper).

Figure 12:
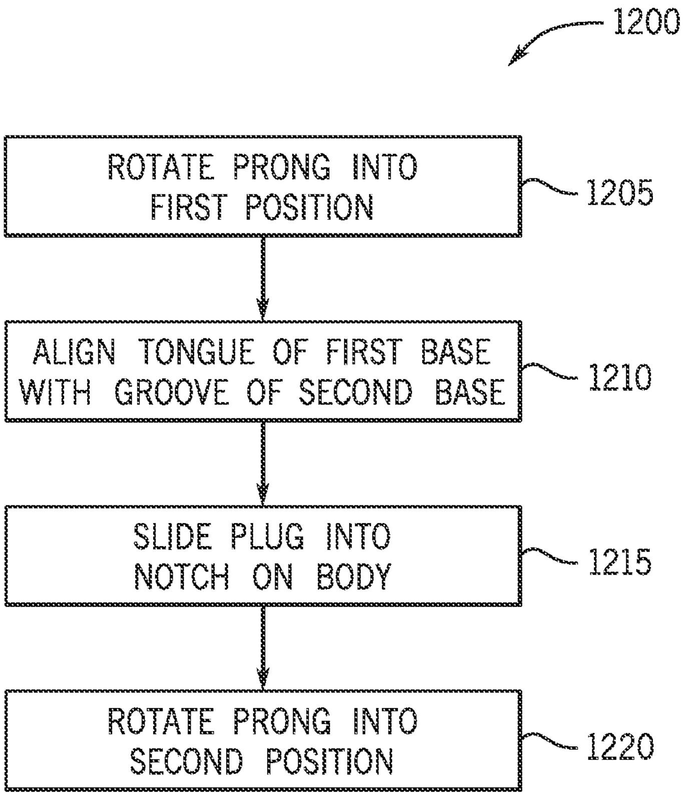
FIG. 12 is a flowchart of an example plug insertion process for use with the example power adapter of FIG. 1.

FIG. 12 depicts a flowchart 1200 showing a process for securing the plug 115 within the notch 305 of the body 110. At stage 1205 a user rotates the prongs 120, 125 into the first position 105 to retract the pins 530, 535 within the opening 830 of the plug 115. As mentioned previously, retracting the pins 530, 535 enables the second base 525 to slide across the first base 310 of the notch 305. At stage 1210 the user begins to slide the plug 115 into the notch 305 formed in the body 110. As the user slides the second base 525 along the first base 310, the user aligns the groove 540 with the tongue 315 and the male connection 340 with the female receptacle 335.

At stage 1215, the user continues to slide the plug 115 into the notch 305 until the male connection 340 is fully inserted into the female receptacle 335 and/or the second face 515 of the plug 115 contacts the first face 330 of the notch 305. At stage 1220 the user rotates the prongs 120, 125 from the first position 105 to the second position 205. For example, the user rotates the prongs 120, 125 approximately 90 degrees from the first position 105 to the second position 205.

As mentioned previously, rotation of the prongs 120, 125 generates corresponding rotation in the shaft 625 about axis 720, which causes the lobe 905 of the cams 630, 705 to push and/or displace the first end 805 of the pins 530, 535 further from the axis 720, which actuates the pins 530, 535 against the biasing force of the biasing element 815 as indicated by arrow 1105 in FIG. 11. Once the prongs 120, 125 are in the second position 205 the pins 530, 535 protrude through the openings 830 in the plug 115 and into the apertures 320, 325 within the first base 310. At this stage, the plug 115 is prevented from movement in two, different, directions as indicated by arrow 915 and arrow 920 in FIG. 9. With the plug 115 locked into the body 110, forming a unitary power adapter 100, the user may plug the power adapter 100 into an outlet for use.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

While various spatial and directional terms, such as top, bottom, lower, mid, lateral, horizontal, vertical, front, and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

What is claimed is:

1. A power adapter, comprising:
a body having a first base;
a plug removable from the body, the plug including a second base defining a groove, a housing, and a shaft rotatably held within the housing;
a tongue extending from the first base, the tongue to slide within the groove to prevent movement of the plug in a first direction; and
a pin held within the plug, the pin receding within the second base when the shaft is in a first position, the pin protruding from the second base when the shaft is in a second position, the pin preventing movement of the plug in a second direction when the shaft is in the second position.

2. The power adapter of claim 1, wherein the shaft includes a prong fixed to the shaft, and wherein rotation of the shaft is generated via corresponding rotation of the prong.

3. The power adapter of claim 1, wherein the shaft includes a cam fixed to an end of the shaft, and wherein the cam actuates the pin between the first position and the second position.

4. The power adapter of claim 1, wherein, in the second position, the pin protrudes through the second base and into an aperture defined by the first base to prevent movement of the plug in the second direction.

5. The power adapter of claim 4, wherein the pin includes a collar mounted to a first end of the pin.

6. The power adapter of claim 5, further comprising:
a biasing element surrounding the pin;
wherein the biasing element biases the pin out of engagement with the aperture when the shaft is in the first position.

7. The power adapter of claim 6, wherein the biasing element is positioned between the collar and second base.

8. The power adapter of claim 7, wherein actuation of the shaft between the first position and the second position actuates the pin against a biasing force generated by the biasing element.

9. A power adapter, comprising:
a body defining a notch, the notch having a first base defining an aperture; and
a plug removable from the body, the plug including a locking assembly, including:
a rotatable shaft having a cam fixed to an end of the shaft;
a prong fixed to the shaft, wherein rotation of the prong generates corresponding rotation in the shaft; and
a pin with a first end and a second end, the first end of the pin in contact with the cam, and the second end of the pin to selectively engage the aperture in the notch to prevent movement of the plug in a second direction;
wherein the prong is rotated between a first position and a second position;
wherein the pin recedes into the locking assembly when the prong is in the first position; and
wherein the pin protrudes into the aperture when the prong is in the second position.

10. The power adapter of claim 9, wherein the pin includes a collar mounted to the first end of the pin.

11. The power adapter of claim 10, further comprising:
a biasing element circumferentially surrounding the pin;
wherein the biasing element biases the pin out of engagement with the aperture when the prong is in the first position.

12. The power adapter of claim 11, wherein the biasing element is positioned between the collar and second base.

13. The power adapter of claim 12, wherein actuation of the prong between the first position and the second position actuates the pin against a biasing force generated by the biasing element.

14. A method of securing a removable plug to a body of a power adapter, comprising:
rotating a prong of the plug into a first position, wherein rotation of the prong generates corresponding rotation in a shaft fixed to the prong to actuate a pin within the plug;
aligning a tongue extending from a first base of the body with a groove defined by a second base of the plug;
sliding the second base of the plug along the first base of the body until a second face of the plug abuts a first face of the body; and
rotating the prong of the plug into a second position, wherein rotation of the prong into the second position actuates the pin to protrude through the second base of the plug and into an aperture within the first base of the body.

15. The method of claim 14, further comprising:
biasing the pin out of engagement with the aperture when the prong is in the first position via a biasing element surrounding the pin.

* * * * *